Charles B. Pettengill, Imp't in Cultivators
Assigned to Freeman C. Merrill
No. 72227
Fig. 1. PATENTED
DEC 17 1867
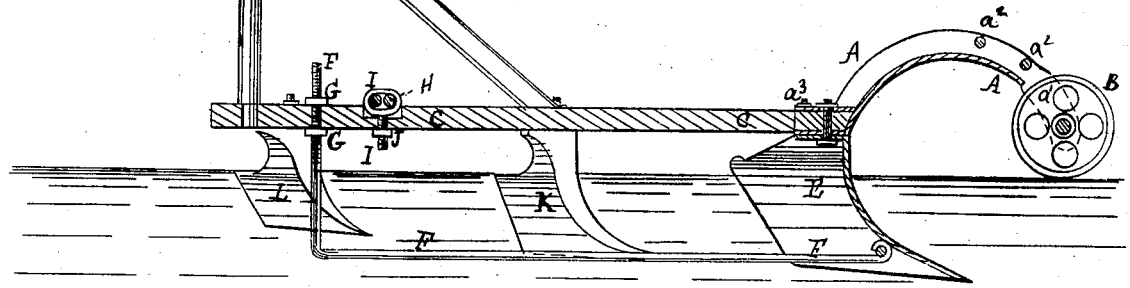
Fig. 2.
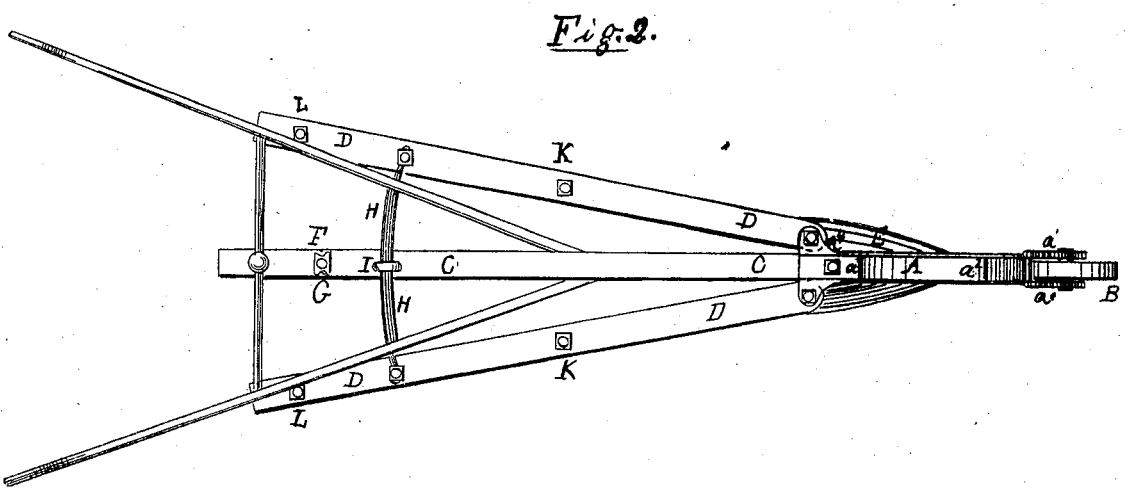
Witnesses,
Theo. Tusche
Wm. Trewin
Inventor
Chas. B. Pettengill
Per Munn & Co.
Attorneys

UNITED STATES PATENT OFFICE.

CHARLES B. PETTENGILL, OF HEBRON, ASSIGNOR TO FREEMAN C. MERRILL, OF PARIS, MAINE.

IMPROVEMENT IN CULTIVATORS.

Specification forming part of Letters Patent No. 72,227, dated December 17, 1867.

*To all whom it may concern:*

Be it known that I, CHARLES B. PETTENGILL, of Hebron, in the county of Oxford and State of Maine, have invented a new and useful Improvement in Cultivators; and I do hereby declare that the following is a full, clear, and exact description thereof, which will enable others skilled in the art to make and use the same, reference being had to the accompanying drawings, forming part of this specification, in which—

Figure 1 is a vertical longitudinal central section of my improved cultivator. Fig. 2 is a top view of the same.

Similar letters of reference indicate like parts.

My invention has for its object to improve the construction of cultivators, so as to make them more easily adjustable and more effective in operation; and it consists in the circular draw-beam formed solid in one piece, with wheel-straps, draft-bars, socket, and ears for the reception of the beams; in the combination of the bent adjusting-rod with the front tooth and with the central beam; in the combination of the ring-bolt, curved adjusting-bars, and beams with each other; and in the combination of the circular draw-beam, bent adjusting-rod, and teeth of different lengths with each other and with the cultivator-frame, the whole being constructed and arranged as hereinafter more fully described.

A is the draw-beam, which is made circular in form, as shown in Fig. 1.

Upon the forward end of the draw-beam A are formed two straps, $a'$, between which the wheel B is pivoted.

$a^2$ are the draft-bars, which are formed upon the forward part of the draw-beam a little above the wheel B.

Upon the rear end of the draw-beam A is formed a socket, $a^3$, for the reception of the forward end of the central beam, C, and upon the sides of the said rear end are formed ears $a^4$, to which are pivoted the forward ends of the side beams, D, of the cultivator. The parts $a'$, $a^2$, $a^3$, and $a^4$ are all cast solid with the draw-beam A.

E is the front tooth, which is secured in place by a bolt passing up through the rear end of the draw-beam A and through the forward end of the central bar, C, as shown in Fig. 1.

F is a rod, the forward end of which is pivoted to the forward tooth, E. The rod F passes back horizontally to the rear part of the cultivator-frame, where it is bent up at right angles and passes up through the beam C, being adjustably secured in place by the nuts G, placed upon the said rod—the one above and the other below the said beam—so that the rear part of the cultivator may be raised or lowered, as may be desired.

H are round, curved, or circular bars or rods, one end of each of which is secured to the side beams, D, in such positions that they may lie alongside of each other upon the upper side of the central beam, C, to which they are secured by the ring-bolt I and nut J, as shown in the drawings, so that the cultivator may be expanded or contracted, as may be desired.

K and L are the teeth of the cultivator, which are made of different lengths, as shown in Fig. 1, so that the machine may act both as a cultivator and hoe when desired, according as it is adjusted by the rod F.

What I claim as new, and desire to secure by Letters Patent, is—

1. The circular draw-beam A, having the wheel-straps $a'$, draft-bars $a^2$, socket $a^3$, and ears $a^4$ cast solid therewith, substantially as herein shown and described.

2. The combination of the bent adjusting-rod F with the front tooth, E, and with the central beam, C, of the cultivator-frame, substantially as herein shown and described, and for the purpose set forth.

3. The combination of the ring-bolt I, curved adjusting-rods H, and beams C and D with each other, substantially as herein shown and described, and for the purpose set forth.

4. The combination of the bent adjusting-rod F, circular draw-beam A, and teeth E K L, of different lengths, with each other and with the beams C and D of the cultivator-frame, substantially as herein shown and described, and for the purpose set forth.

The above specification of my invention signed by me this 19th day of April, 1867.

CHARLES B. PETTENGILL.

Witnesses:
 ALPEUS SLOAN,
 G. A. WILSON.